(No Model.)
O. N. M. WATSON.
TOY MUSICAL BLOCK.
No. 430,157. Patented June 17, 1890.
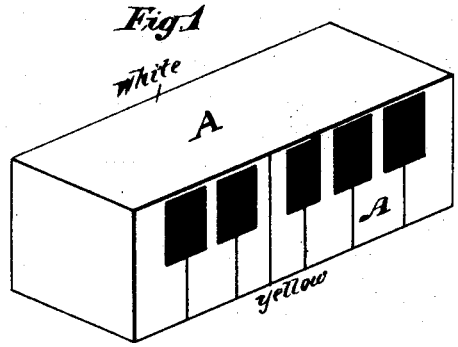
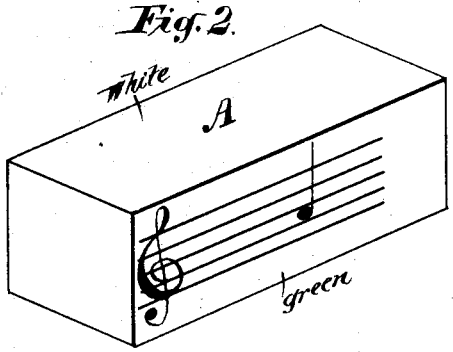
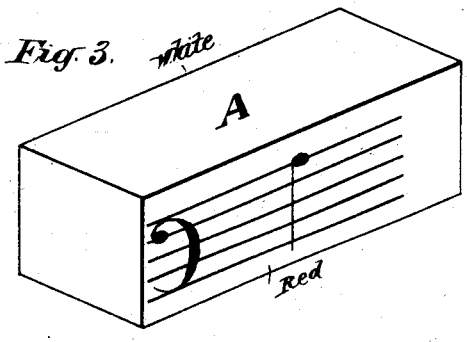
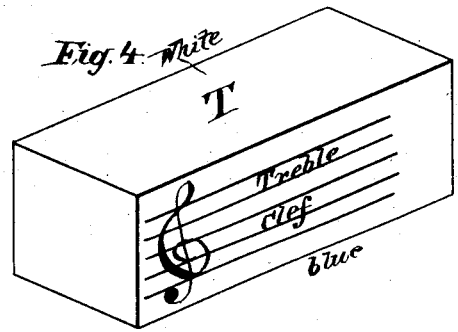
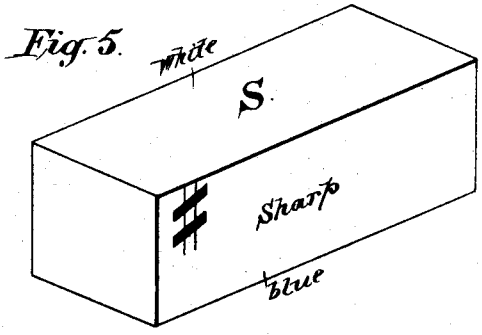
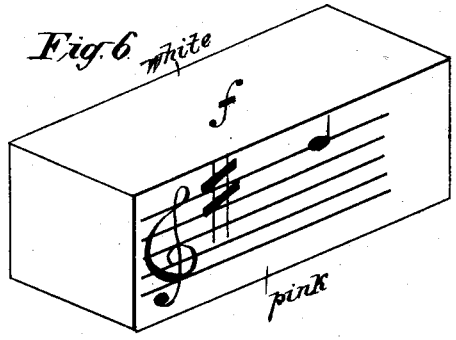
WITNESSES:
L. L. Surden
A. S. Fitch
INVENTOR
Olivia N. M. Watson
BY
Theodore A. B. Putnam
ATTORNEY

UNITED STATES PATENT OFFICE.

OLIVIA NOBLE MARY WATSON, OF NEW YORK, N. Y.

TOY MUSICAL BLOCK.

SPECIFICATION forming part of Letters Patent No. 430,157, dated June 17, 1890.

Application filed March 10, 1887. Serial No. 230,346. (No model.)

*To all whom it may concern:*

Be it known that I, OLIVIA NOBLE MARY WATSON, a resident of the city, county, and State of New York, have invented a certain new and useful improvement in blocks for musical and other instruction and a new system or method of teaching the alphabet, musical notes and expressions, and also the corresponding keys of a piano key-board all at one and the same time or simultaneously, (for which I have obtained no Letters Patent,) of which the following is a specification.

Blocks with alphabet-letters thereon have been in use for many years and are no novelty. Blocks with alphabet-letters thereon have been in use, also, in connection with the usual musical signs.

The object of my invention is to provide a block and set of blocks having an alphabet-letter, a musical clef, a note, a sign, and an expression or expressions corresponding on each block with the alphabet-letters thereon, and also having on one or more sides a representation of the keys of a piano key-board with the key corresponding to the letter on the block and identified as such; also, blocks corresponding therewith, to be used in combination therewith, having thereon other alphabetical letters and musical signs, as indicating the clef, the quality of the note, &c.

The further object of my invention is to provide a new system or method of teaching the alphabet, the musical notes, and the corresponding keys of a piano key-board simultaneously, together with the other musical signs and expressions identified by letter. These blocks are to be made of any size or form and of any material, but preferably of wood, and of the same face-width as a piano-key, so that they may be placed on the key-board of a piano in correspondence with the keys of the same. The practical object of these blocks is to provide means whereby the letters of the alphabet, the notes and principles of music, and the keys of the piano may be simultaneously identified and taught to pupils.

I do not confine myself to the English alphabet-letters, as the letters of any language may be used instead thereof and in the same manner. I attain these objects by the means and mechanism illustrated in the accompanying drawings, in which—

Figure 1 shows the alphabet-letter A on one face and twelve keys of a piano key-board on another face, with the A key identified by the letter A. Figs. 2 and 3 show a similar arrangement of the alphabet-letter A, and a musical staff with a corresponding musical note, Fig. 2 showing the G clef, and Fig. 3 the F clef. Figs. 4, 5, and 6 show other musical expressions identified by letter and otherwise.

The blocks are represented as having faces of different colors. On one face of a block is displayed an alphabet-letter, and on any of the other faces musical keys, notes, signs, &c., are similarly shown. Fig. 1 shows such a block with the alphabet-letter A on one face and the twelve sound-keys of a piano key-board on another face, with the A key marked with a letter A. Thus on block Fig 1 the alphabet-letter and designated key are of the same name.

Fig. 2 shows a similar arrangement to Fig. 1 of the letter A on one block-face, the other face showing treble staff-lines with the note A in position in its proper space. Thus in Fig. 2 the alphabet-letter A and the staff-note are also of the same name.

Fig. 3 shows a similar arrangement to Fig. 2, having base staff-lines with the note A in position, the alphabet-letter and note here also being of the same name. This arrangement is continued on other blocks for all the musical notes, the alphabet-letter and the key or note on the same block always corresponding in name.

The blocks Figs. 2 and 3 can be dispensed with, if desirable, and the four faces of block Fig. 1 be used for all the expressions of Figs. 1, 2, and 3. Thus on one face would be the alphabet-letter A, on another face the key A, on another face the treble staff-note A, and on another face the base staff-note A. Thus the one block would correspond in all its four faces to the one expression A for an alphabet-letter, two musical signs, and a part of the piano key-board with the corresponding key identified.

In Figs. 4, 5, and 6 are shown other alphabet-letters and musical signs. On block 4 is a treble clef-sign and a letter T, on block 5 a a sharp sign and a letter S, and on block 6 a small letter *f* and a treble staff marked with an F-sharp sign with the note in position.

My arrangement of colors, whether using one color for an entire block or different-colored or partially-colored faces for the same block, is to facilitate the grouping of similar musical signs by like colors. Thus if all the blocks displaying keys were yellow or the one face yellow, as shown in Fig. 1, all the blocks bearing that color could be grouped together, and if like colored faces were all laid in the same plane all the keys or one class of musical expressions would be seen side by side. The same plan holds with the other blocks of Figs. 2, 3, 4, 5, and 6, on which I have designated face-colors in the drawings.

I do not confine myself to any particular arrangement of colors for any special class of musical signs, nor to any particular number of blocks, letters, or alphabets. I use capital and small letters, and reserve the right to use such grouping and arrangement of blocks, letters, colors, and musical expressions as shall best serve the purposes, as herein set forth.

I claim as my invention—

1. A geometrical block identified by an alphabet-letter and having represented on one of its faces a part of a piano key-board with the corresponding key identified by the letter.

2. A set of geometrical blocks, each identified by an alphabet-letter having a part of the keys of a key-board represented thereon with the corresponding key identified by letter.

3. A set of geometrical blocks, each identified by an alphabet-letter having a part of the keys of a key-board represented thereon with the corresponding key identified by letter, and also the corresponding notes, signs, and other corresponding musical expressions represented on other sides thereof.

4. A series of geometrical blocks in combination, having thereon alphabet-letters and graphically-displayed keys of a piano key-board, each with the corresponding key designated by its proper alphabet-letter, substantially as set forth.

5. A series of geometrical blocks in combination, having thereon alphabet-letters and graphically-displayed keys of a piano key-board, each with the corresponding key designated by its proper alphabet-letter, substantially as set forth, and also the corresponding notes, signs, and other corresponding musical expressions represented on other sides thereof.

OLIVIA NOBLE MARY WATSON.

Witnesses:
T. A. B. PUTNAM,
CHAS. J. WATSON.